United States Patent [19]
Abernethy

[11] Patent Number: 5,934,620
[45] Date of Patent: Aug. 10, 1999

[54] SPACECRAFT SUN-TARGET STEERING ABOUT AN ARBITRARY BODY AXIS

[76] Inventor: David K. Abernethy, 1233 Flores St., #105, Los Angeles, Calif. 90069

[21] Appl. No.: 08/610,774

[22] Filed: Mar. 4, 1996

[51] Int. Cl.$^6$ .................................................... B64G 1/24
[52] U.S. Cl. ........................................... 244/168; 244/169
[58] Field of Search .................................. 244/164, 168, 244/169, 173

[56] References Cited

U.S. PATENT DOCUMENTS

| | | | |
|---|---|---|---|
| 3,144,219 | 8/1964 | Schnitzer | 244/159 |
| 4,591,116 | 5/1986 | Guenther et al. | 244/168 |
| 4,747,567 | 5/1988 | Johnson et al. | 244/173 |
| 4,786,019 | 11/1988 | Uken | 244/169 |
| 5,310,144 | 5/1994 | Salvatore et al. | 244/168 |
| 5,312,073 | 5/1994 | Flament et al. | 244/173 |
| 5,653,407 | 8/1997 | Bertheux et al. | 244/173 |

FOREIGN PATENT DOCUMENTS

| | | |
|---|---|---|
| 0372434 | 6/1990 | European Pat. Off. |
| 2479568 | 10/1981 | France . |
| WO 92/19498 | 11/1992 | WIPO . |

OTHER PUBLICATIONS

European Search Report, Application No. EP 97 10 3222, dated Jun. 27, 1997.

Patent Abstracts of Japan, Publication No. JP 01237296, Publication date: Sep. 21, 1989.

*Primary Examiner*—Galen L. Barefoot
*Attorney, Agent, or Firm*—Terje Gudmestad; Georgann Grunebach; Michael W. Sales

[57] ABSTRACT

A spacecraft traveling in a volume of space receiving radiation from a radiation source and having a spacecraft body having a first axis of symmetry, X, a second axis of symmetry, Y, and a third axis of symmetry, Z. The spacecraft body rotates about a rotation axis, T, which defines a nonzero angle of inclination $\lambda$ relative to the Z axis. A radiation receiving element is rotatably attached to the spacecraft body along an axis, S. A control system is employed on the spacecraft for rotating the spacecraft body about the rotation axis T by an angular amount $\gamma$ and rotating the radiation receiving element by an amount so that the radiation receiving element is normal to the radiation source.

17 Claims, 3 Drawing Sheets

SPACECRAFT SUN-TARGET STEERING ABOUT AN ARBITRARY BODY AXIS

BACKGROUND OF THE INVENTION

The present invention relates in general to a spacecraft with a solar panel. In particular, the present invention relates to a system and method for orienting the solar array so that it faces and constantly tracks the sun.

In the past, spacecraft have tracked the sun with their solar panels using a steering method called sun-nadir steering. Sun-nadir steering is steering the attitude of a three-axis spacecraft about its yaw coordinate axis, Z, which is facing toward nadir or the Earth center. Spacecraft having solar panels that use this type of steering are generally in non-geosynchronous inclined orbits and, due to the inclination of the orbit the solar panels, are made to face the sun only by steering the body of the spacecraft about the yaw axis, Z, and rotating the solar arrays about the pitch axis, Y.

Sun-nadir steering about the yaw axis does not allow an arbitrarily placed line of force of a thruster on a spacecraft to be pointed for delta-V corrections in a specific inertial direction while simultaneously orienting the solar array to track the sun. This severely limits the use of electric ion thrusters to provide delta-V for geosynchronous transfer orbit raising since such thrusters would require the solar array to be constantly pointed at the sun in order to give power to the thrusters. Because it requires rotation about the yaw axis and not an arbitrary axis, sun-nadir steering also limits the ability to utilize sensors or thrusters along an arbitrary axis. Furthermore, if a large number of electrical devices are employed on the spacecraft, such as sensors and communication antennas, they may not receive sufficient electrical power from the solar arrays since the arrays are not constantly pointed to the sun. The thruster configurations available with sun-nadir steering does not generally allow for transfer orbit and stationkeeping operations.

SUMMARY OF THE INVENTION

The present invention provides a method of steering a spacecraft. The method of the present invention liberalizes the way a spacecraft is oriented during its travel and, thus, allows a greater flexibility in the choice of propulsion on the spacecraft and leads to improved power generation on the spacecraft by solar panels.

In particular, the present invention concerns a spacecraft traveling in a volume of space receiving radiation from a radiation source and having a spacecraft body having a first axis of symmetry, X, a second axis of symmetry, Y, and a third axis of symmetry, Z. The spacecraft body rotates about a rotation axis, T, which defines a nonzero angle of inclination $\lambda$ relative to the Z axis. A radiation receiving element is rotatably attached to the spacecraft body along an axis, S. A control system is employed on the spacecraft for rotating the spacecraft body about the rotation axis T by an angular amount $\gamma$ and rotating the radiation receiving element by an amount so that the radiation receiving element is normal to the radiation source.

Another aspect of the present invention is a method of aligning a radiation receiving element of a spacecraft with a radiation source, wherein the spacecraft has a spacecraft body having a first axis of symmetry, X, a second axis of symmetry, Y, and a third axis of symmetry, Z. The method entails measuring where the radiation source is positioned relative to the radiation receiving element and rotating the spacecraft body about a rotation axis, T, by an angular amount $\gamma$ in response to the measured position so that the radiation receiving element is normal to the radiation source, wherein T defines a nonzero angle of inclination $\lambda$ relative to the Z axis.

Both aspects of the present invention provide the advantage that they allow an arbitrarily placed line of force of a thruster on a spacecraft to be pointed for delta-V corrections in a specific inertial direction while simultaneously orienting the solar array to track the sun.

Both aspects of the present invention provide the advantage that they constantly point the array at the sun and, thus, the array will produce sufficient electric power to use electric ion thrusters to provide delta-V for geosynchronous orbit stationkeeping.

Another advantage provided by both aspects of the present invention is that they allow an arbitrarily placed axis of a sensor, communication's antenna or other device to be pointed in a specific inertial direction, while simultaneously orienting the solar array to track the sun.

A fourth advantage of both aspects of the present invention is that they constantly point the array toward the sun so that sufficient electrical power is generated to power a large number of electrical devices on the spacecraft.

A fifth advantage of the present invention is that it uses an electrical thruster configuration that allows for both transfer orbit and stationkeeping operations.

The foregoing features and advantages of the present invention will be further understood upon consideration of the following detailed description of the invention taken in conjunction with the accompanying drawings, in which:

DESCRIPTION OF THE PREFERRED EMBODIMENT

Figure 1:
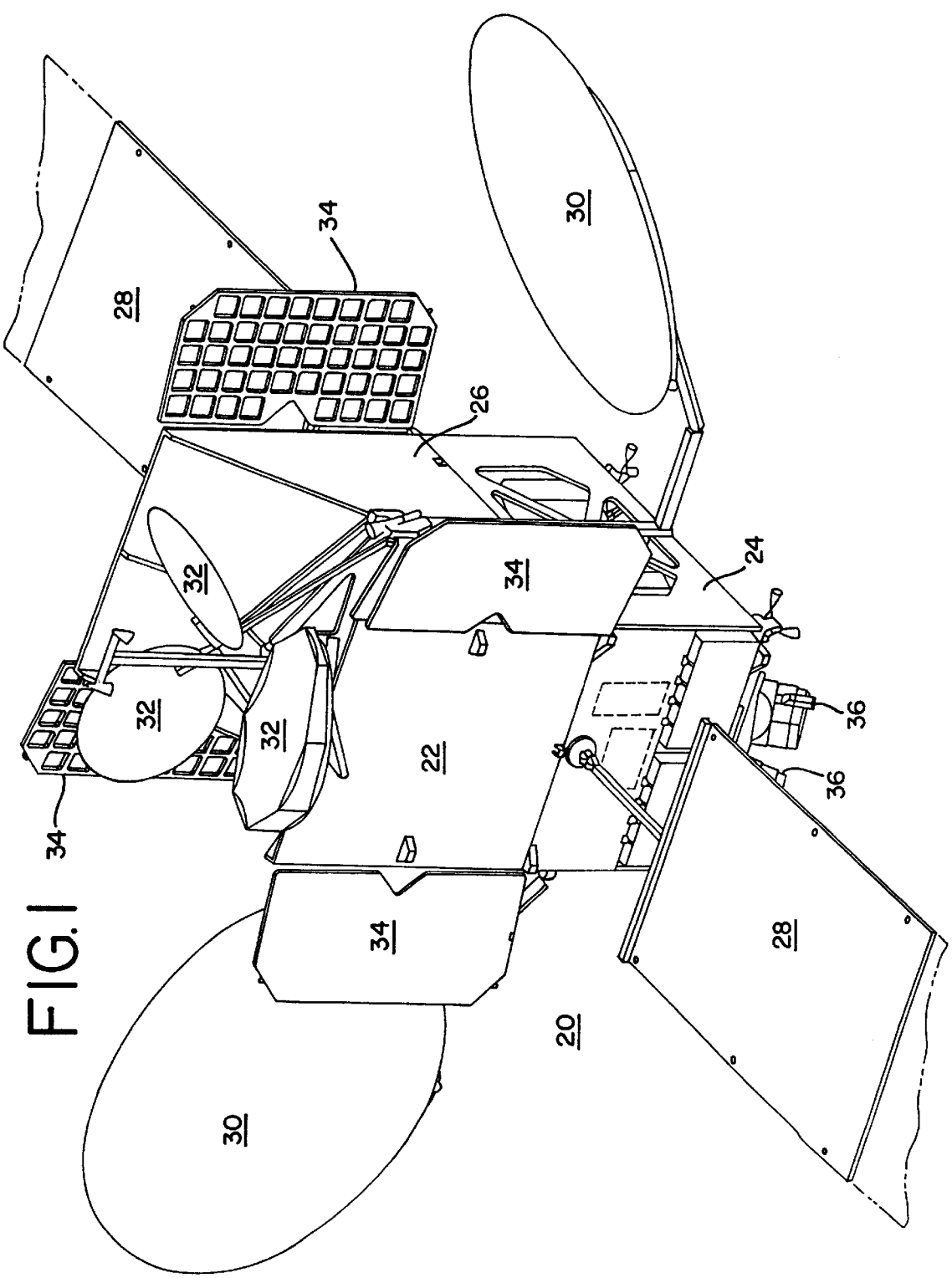
FIG. 1 shows a spacecraft using the steering system and method according to the present invention.
Figure 2:
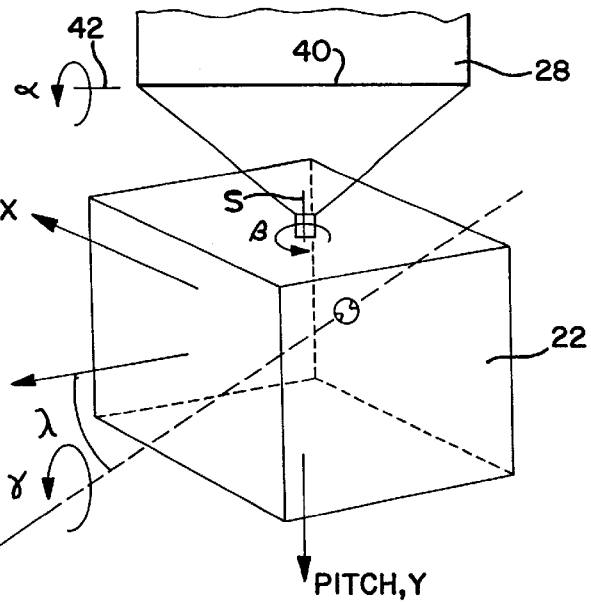
FIG. 2 shows a schematic view of the spacecraft of FIG. 1 using the steering system and method according to the present invention.
Figure 3:
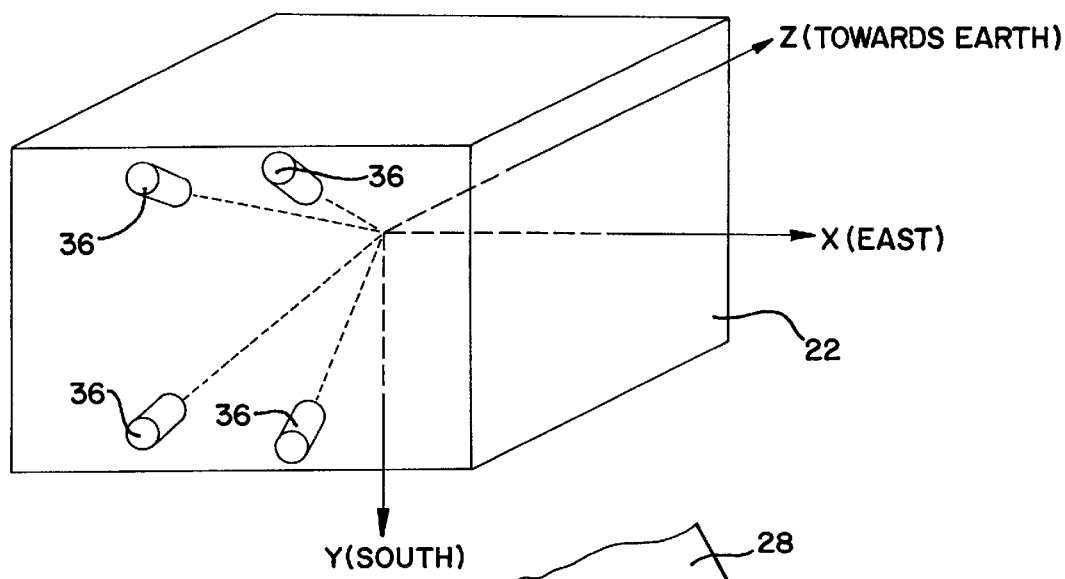
FIG. 3 schematically shows the thruster layout for the spacecraft of FIG. 2.

A spacecraft or satellite 20 according to the present invention is shown in FIGS. 1–6. In particular, a spacecraft or satellite 20 is shown in FIGS. 1–3 which is designed for traveling in a volume of outer space, such as an orbital path around the Earth. Satellite 20 has a spacecraft body 22 which includes a lower bus module 24 and an upper payload module 26. Attached to the aft end of the lower bus module 24 are a plurality of engines which will be discussed in detail later. Lower bus module 24 contains fuel tanks (not shown) and various power and control modules which operate the engines and power the payload module 26. Bus module 24 further includes a pair of solar panels 28 which convert sunlight into electricity which is sent to batteries (not shown) located on the bus module 24. Bus module 24 also has one or more antennae 30 and reflectors 32 which receive signals from a ground station on Earth which are used to control the satellite 20. Antennae 30 also send signals to the ground station.

Payload module 26 is attached to the bus module 24 and contains a variety of electronic equipment which may contain a number of sensors (not shown). The electronic equipment processes information gathered by the sensors and sends the processed information back to the ground station via antennae 30. Payload module 26 further includes heat radiators 34 which emit heat generated by the satellite 20.

As shown in FIG. 3, the spacecraft 20 preferably has four electronic thrusters, such as xenon ion propulsion thrusters 36. Spacecraft body 22 has a first axis of symmetry defining a roll axis, X, a second axis of symmetry defining a pitch axis, Y, and a third axis of symmetry defining a yaw axis, Z. The thrusters 36 are attached to the aft side of the spacecraft body 22, pointing away from the Earth. These electronic thrusters 36 can be used in a single orientation for use in transfer orbit attitude and orbital velocity corrections and for geosynchronous orbit stationkeeping thruster burns. The use of a single orientation for both types of thruster burn corrections avoids the necessity of a deployment mechanism for moving the thrusters 36 from the transfer orbit orientation to the geosynchronous orbit stationkeeping orientation. Also, the single orientation allows greater clearance to the launch vehicle adapter (not shown).

Besides thrusters 36, the spacecraft body 12 also may have a variety of electronic packages on board which require large amounts of electrical energy, such as scientific experimental packages, sensors or communications antennae 30. Such electronic packages and electronic thrusters 36 need to be fed electrical power. Since the spacecraft 20 will be within sight of the sun 38, two or more radiation receiving elements, such as solar panels 28, are deployed to receive radiation from a radiation source, like the sun 38. The solar panels 28 convert the radiation from the sun 38 into electricity in a well known manner and the electricity is distributed to the electronic components on the spacecraft body 22.

In order to maximize the amount of electrical power generated by the solar panels 28, it is necessary to have the direction to the sun 38 be constantly normal with the plane defined by the solar panels 28. FIGS. 2–8 demonstrate how this constant tracking can be accomplished.

Figure 4:
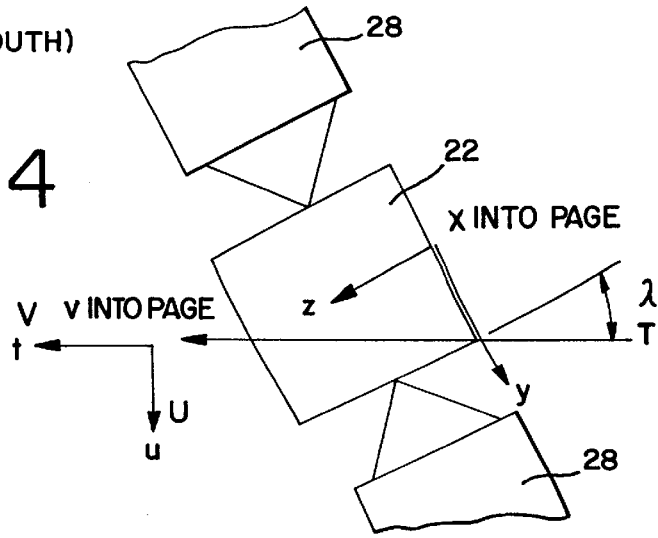
FIG. 4 shows the spacecraft geometry of the spacecraft of FIG. 2.

In FIGS. 2 and 4, the spacecraft 20 has a thruster 36 preferably aligned with the orbit. It is understood that thruster 36 can be aligned along a different direction without departing from the spirit of the present invention. A torque generator, such as thruster 36, produces thrust along a thrust line T which defines a rotation axis about which spacecraft body 22 rotates. Internal momentum wheels produce a torque to rotate the spacecraft body 22 about rotation axis T. Rotation axis T and the Z-axis define a nonzero angle of inclination, λ, which has a value which ranges from approximately 0° to 180°, and preferably 30° to 45°. Besides the spacecraft body 22, each solar panel 28 is able to rotate. Each solar panel 28 is rotatably attached to the spacecraft body 22 so that the solar panel 28 can rotate relative to the spacecraft body 22 about an axis, S. Such rotatable attachment is well known in the art. Each solar panel 28 has a hinge 40 which is capable of pivoting so the solar panel 28 rotates about a secondary axis 42 which is perpendicular to the S-axis.

Figure 5:
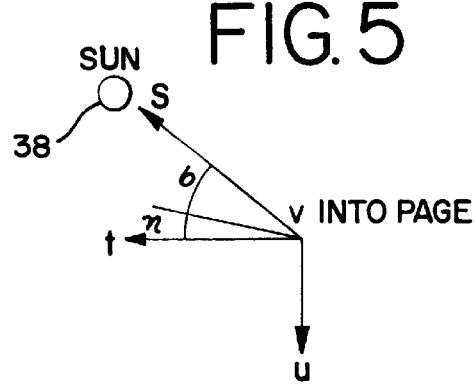
FIG. 5 schematically shows the spacecraft geometry in relation to the sun.

As described above and below, the spacecraft 20 and solar panels 28 are able to rotate about three axes T, S, 42. In order to maximize the amount of solar radiation received by the solar panels 28, the normal of the plane defined by each panel 28 needs to be constantly pointed toward the sun 38 by being aligned with the sun vector s, as shown in FIG. 5.

In FIG. 2, a sample position of the solar panels 28 is shown where they lie in a plane defined by the Y and Z axes and thruster 36 produces thrust along thrust axis T which lies in the spacecraft body's Z-Y plane. The desired inertial pointing direction of the thruster 36 is assumed to be in the earth's equatorial plane towards the vernal equinox. The spacecraft 20 is assumed to be in earth orbit, revolving around the sun 38 with the earth. It is understood that the spacecraft 20 could be used in any orbit about the sun or other planetary object. As shown in FIG. 2, thruster 36 is canted by an angle of inclination, λ, about the X-axis as measured from the Z-axis. The thrust line T lies in the Y-Z plane.

In order to better describe the alignment operation, the orientation of the spacecraft body 22 is expressed in terms of a new set of orthogonal axes T, U and V, as shown in FIG. 4. The original unit vectors x, y, and z of the spacecraft coordinates can be expressed in terms of unit vectors t, u and v aligned with the T, U and V axes, respectively, as follows:

x=v y=−sinλt+cosλu z=cosλt+sinλu

The plane defined by the t and v unit vectors is placed, for simplicity, in the earth's equatorial plane with t pointing towards the vernal equinox.

The first step in aligning the sun panels 28 is to measure the position of the sun 38 relative to the normal of the solar panel 28. This measurement can be performed either on board the spacecraft 20 or on the ground at the mission control in a well known manner. The measurement includes the azimuth and elevational angles η and ρ, respectively, of the unit vector s measured relative to the rotation axis T, as shown in FIG. 5. The expression for s in terms of the T, U, V frame unit vectors is:

$s = \cos(\eta)\cos(\rho)t - \sin(\rho)u + \sin(\eta)\cos(\rho)v.$

Figure 6:
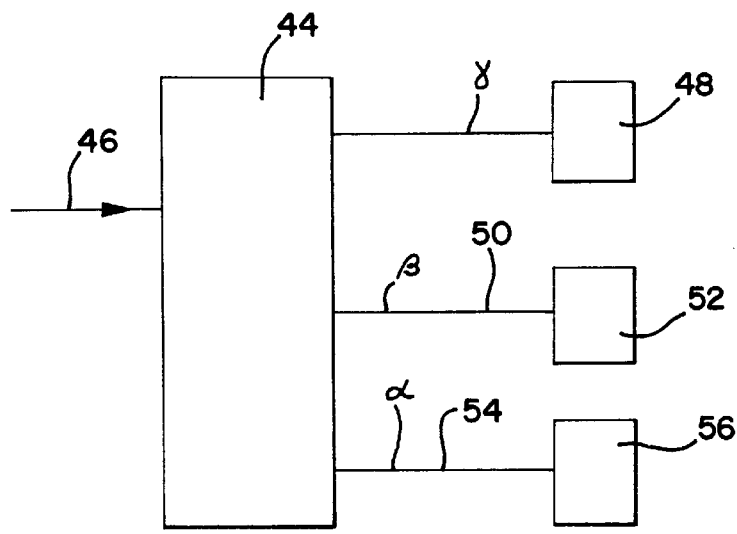
FIG. 6 schematically shows a control system for controlling the steering of the spacecraft of FIG. 2.

Once the position of the sun 38 is measured, control system 44 located on the spacecraft 20 receives a signal 46 representative of the sun's measured angular position relative to rotation axis T, as shown in FIG. 6. Control system 44 preferably is a microprocessor. The control system 44 then calculates an angle γ and sends a control signal to the torque generator 48 in order to rotate the spacecraft body 22 about rotation axis T by an angular amount γ so that the solar panel 28 is rotated so that the sun vector s is as close as possible to being perpendicular or normal to the plane defined by solar panel 28.

Figure 7:
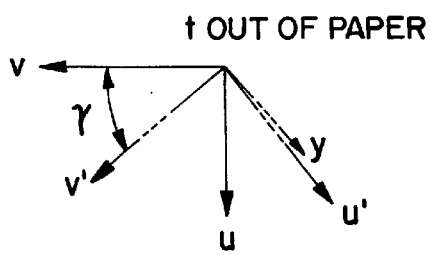
FIG. 7 shows a diagram of an alternative coordinate system to describe the spacecraft geometry of the spacecraft of FIG. 2.

As shown in FIG. 7, rotation by γ results in the formation of a new orthogonal system with new unit vectors u', v' and t' with the t' unit vector coming out of the page.

The new unit vectors u', v' and t' can be expressed in terms of the unit vectors u, v and t as follows:

t'=t u'=cosγu−sinγv v'=sinγu+cosγv

Since the spacecraft body's Y-axis is rotated with the unit vector u to u' (they are in the same plane), the Y-axis unit vector, y, is now expressed as:

$y = -\sin\lambda t + \cos\lambda u'$

Substituting for u' gives y in terms of the unit vectors t,u,v:

$y=-\sin\lambda t+\cos\lambda[-\sin\gamma v+\cos\gamma u]$

Since it has been assumed for this example that the solar panels 28 lie within the Y-Z plane, the angle $\theta_{sun}$ defined between the sun vector s and the Y-axis ideally is as near as equal to 90° as possible. Expressed in another way, the scalar product between the unit vectors y and s is equal to zero. The scalar product is expressed below:

$y \cdot s=-\sin\lambda\cos(\eta)\cos(\rho)-\cos\gamma\cos\lambda\sin(\rho)-\sin\gamma\cos\lambda\sin(\eta)\cos(\rho)=\cos\theta_{sun}=0.$ Solving for $\gamma$:

$$\gamma = \sin^{-1}\left[\frac{-\sin\lambda\cos\eta\cos\sigma}{\sqrt{(\cos\lambda\sin\sigma)^2+(\cos\lambda\sin\eta\cos\sigma)^2}}\right]-$$

$$\sin^{-1}\left[\frac{\cos\lambda\sin\sigma}{\sqrt{(\cos\lambda\sin\sigma)^2+(\cos\lambda\sin\eta\cos\sigma)^2}}\right]$$

If there is no angle $\gamma$ which makes $\cos\theta_{sun}$ equal to zero, then control system 44 calculates an angle $\beta$ and sends a control signal 50 to motor 52 which enables the solar panel 28 to rotate about the S-axis, relative to the spacecraft body 22, by an angular amount $\beta$ so that the solar panel 28 is as close to perpendicular or normal to the sun vector s. Similarly, if rotations by $\gamma$ and $\beta$ do not result in acceptable alignment with the sun 38, then control system 44 calculates an angle $\alpha$ and sends a control signal 54 to a motor 56 which rotates solar panel 28 about secondary axis 42 by an angular amount $\alpha$. Control system 44 sends a control signal which rotates the solar panel 28 by an angular amount $\alpha$ so that the solar panels 28 are normal to the sun 38. Of course, if the rotation by $\gamma$ results in the solar panel 28 being perpendicular or normal to the sun vector s, then no other rotations of the solar panel 28 are needed and, thus, $\beta=0°$ and $\alpha=0°$.

The calculations performed by the control system 44 when there is no angle $\gamma$ which can alone provide proper alignment are derived below. In particular, if the sun is within a cone centered around the T axis with half angle $\lambda$, then there is no angle $\gamma$ which places the sunline in the XZ plane. Therefore, a $\gamma$ must be found that places the sun as close as possible to the XZ plane. This $\gamma$ is found by finding the scalar product of y and s that is closest to zero, or the minimum of the difference of the scalar product and zero. By taking the first derivative of the difference of the scalar product and zero and setting it equal to zero, the minimum can be found:

$$\frac{d}{d\gamma}(0-\cos\theta_{sun})=(-\cos\lambda\sin\sigma\sin\gamma+\cos\lambda\sin\eta\cos\sigma\cos\gamma)=0$$

Solving for $\gamma$:

$$\gamma=\tan^{-1}\left(\frac{\sin\eta\cos\sigma}{\sin\sigma}\right)\pm(\pi,2\pi\ldots),\text{ for }\theta_{sun}\text{ closest to 90°}.$$

Figure 8:
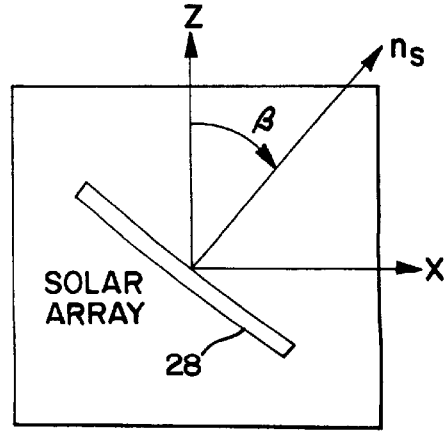
FIG. 8 schematically shows the normal vector of a solar panel for the spacecraft of FIG. 1.

In order to find the solar panel mechanism axis S and angle $\beta$, the normal vector to the solar panel must be defined in the t,u,v coordinates. FIG. 8 shows the definition of $\beta$ and the normal vector of the solar panels 28.

The normal vector of the solar panels 28 is:

$n_s=\sin\beta x+\cos\beta z$

Now express the normal vector of the solar panels 28 in the t,u,v frame:

$n_s=(\cos\beta\cos\lambda)t+(\sin\beta\sin\gamma+\cos\beta\sin\lambda\cos\gamma)u+(\sin\beta\cos\gamma-\cos\beta\sin\lambda\sin\gamma)v$ To find the $\beta$ which makes the solar panels 28 normal vector parallel to the sun vector (array pointing to the sun), take the scalar product of the two and set it equal to one:

$n_s \cdot s=(\cos\lambda\cos\eta\cos\rho-\sin\lambda\cos\gamma\sin\rho-\sin\lambda\sin\gamma\sin\eta\cos\rho)\cos\beta+(-\sin\gamma\sin\rho+\cos\gamma\sin\eta\cos\rho)\sin\beta=1$ To simplify, substitute:

$a=(\cos\lambda\cos\eta\cos\rho-\sin\lambda\cos\gamma\sin\rho-\sin\lambda\sin\gamma\sin\eta\cos\rho)$ $b=(-\sin\gamma\sin\rho+\cos\gamma\sin\eta\cos\rho)$ $c=1$ then solve:

$a\cos\beta+b\sin\beta=c$

The first solution for $\beta$ is for the case when there exists a $\gamma$ that makes $\theta_{sun}=90°$:

$$\beta=\sin^{-1}\left(\frac{c}{\sqrt{a^2+b^2}}\right)-\sin^{-1}\left(\frac{a}{\sqrt{a^2+b^2}}\right)$$

for $\gamma$ which makes $\theta_{sun}=90°$.

The second solution for $\beta$ is for the case where $\gamma$ makes $\theta_{sun}$ closest to 90°. The angle $\beta$ must be found which makes the scalar product of n and s closest to one. To find this angle, the first derivative of the difference of scalar product and one is taken, and the minimum is found by setting the derivative equal to zero:

$$\frac{d}{d\gamma}(1-n\cdot s)=a\sin\beta-b\cos\beta=0$$

Solving for $\beta$:

$$\beta=\tan^{-1}\left(\frac{b}{a}\right)\pm(\pi,2\pi\ldots)$$

for which $\gamma$ which makes $\theta_{sun}$ closest to 90°.

Once the angles $\gamma$ and $\beta$ are found to minimize the angle between the solar array normal and the sun vector, the expression for $\alpha$ can be found. If $\gamma$ and $\beta$ have been found which make the solar panel normal parallel to the sun vector, then no mechanism axis 1 rotation is necessary and $\alpha=0$. Otherwise, $\alpha$ is simply the same angle as the angle between the solar panel normal and the sun vector:

$\alpha=0$ for $\gamma$ and $\beta$ which make $\theta=90°$.

or:

$\alpha=\cos^{-1}[(\cos\lambda\cos\eta\cos\rho-\sin\lambda\cos\gamma\sin\rho-\sin\lambda\sin\gamma\sin\eta\cos\rho)\cos\beta+(-\sin\gamma\sin\rho+\cos\gamma\sin\eta\cos\rho)\sin\beta]$ for $\gamma$ and $\beta$ which make $\theta_{sun}$ closest to 90°.

Once $\alpha$ and $\beta$ have been calculated by control system 44, control signals 50 and 54 are sent to motors 52 and 56, respectively, so that the solar panel 28 is properly aligned.

In summary, the present invention provides a steering mechanism for a spacecraft which allows for improved alignment of the solar panels with the sun. Accordingly, the present invention provides for increasing the power generated on a spacecraft from solar panels while simultaneously orienting and firing electronic thrusters.

The foregoing description is provided to illustrate the invention, and is not to be construed as a limitation. Numerous additions, substitutions and other changes can be made to the invention without departing from its scope as set forth in the appended claims. Furthermore, the sample orientations of the spacecraft and solar panels used to derive the angular expression should be viewed as being arbitrarily chosen and in no way limiting the orientation of the invention as claimed.

I claim:

1. A spacecraft traveling in a volume of space receiving radiation from a radiation source, said spacecraft comprising:

a spacecraft body having a first axis of symmetry defining a roll axis, X, a second axis of symmetry defining a pitch axis, Y, and a third axis of symmetry defining a yaw axis Z;

said spacecraft body rotating about a rotation axis, T, which defines a nonzero angle of inclination λ relative to said Z axis;

a radiation receiving element rotatably attached to said spacecraft body along an axis, S; and a control system for rotating said spacecraft body about said rotation axis T by an angular amount γ and rotating said radiation receiving element by an amount so that said radiation receiving element is normal to said radiation source, said control system comprising a thruster aligned along said rotation axis, T.

2. The spacecraft of claim 1, wherein said thruster comprises an electronic thruster.

3. The spacecraft of claim 2, wherein said electronic thruster is an ion propulsion thruster.

4. The spacecraft of claim 3, wherein said ion propulsion thruster comprises a xenon ion propulsion thruster.

5. The spacecraft of claim 1, wherein said radiation receiving element comprises a sensor.

6. The spacecraft of claim 1, wherein said radiation receiving element comprises an antenna.

7. The spacecraft of claim 1, wherein said radiation receiving element comprises a solar panel.

8. The spacecraft of claim 1, wherein said control system receives a control signal representative of the angular orientation of said radiation source relative to rotation axis T and said control system rotates said spacecraft body by said angular amount γ in response to said control signal.

9. The spacecraft of claim 8, wherein said radiation receiving element rotates about said S-axis by an angular amount β so that said radiation receiving element is normal to said radiation source; and said control system rotates said radiation receiving element by said angular amount β in response to said control signal.

10. The spacecraft of claim 9, said radiation receiving element comprises a hinge to allow said radiation receiving element to rotate about a secondary axis which is perpendicular to said S-axis;

wherein said radiation receiving element rotates about said secondary axis by an angular amount α so that said radiation receiving element is normal to said radiation source; and said control system rotates said radiation receiving element by said angular amount α in response to said control signal.

11. The spacecraft of claim 8, wherein said control signal comprises information regarding the azimuth and elevational angles η and ρ, respectively, of said radiation source relative to said rotation axis T.

12. The spacecraft of claim 11, wherein said control system includes a microprocessor programmed to calculate γ from the formula:

$$\gamma = \sin^{-1}\left[\frac{-\sin\lambda\cos\eta\cos\sigma}{\sqrt{(\cos\lambda\sin\sigma)^2 + (\cos\lambda\sin\eta\cos\sigma)^2}}\right] - \sin^{-1}\left[\frac{\cos\lambda\sin\sigma}{\sqrt{(\cos\lambda\sin\sigma)^2 + (\cos\lambda\sin\eta\cos\sigma)^2}}\right]$$

13. The spacecraft of claim 9, wherein if rotation of said spacecraft body by γ results in said radiation receiving element being normal to said radiation source, then β=0°.

14. A method of aligning a radiation receiving element of a spacecraft with a radiation source, wherein said spacecraft has a spacecraft body having a first axis of symmetry defining a roll axis, X, a second axis of symmetry defining a pitch axis, Y, and a third axis of symmetry defining a yaw axis, Z, said method comprising the steps of:

measuring where said radiation source is positioned relative to said radiation receiving element;

rotating said spacecraft body about a rotation axis, T, by an angular amount γ in response to said measured position so that said radiation receiving element is normal to said radiation source, wherein T defines a nonzero angle of inclination λ relative to said Z axis; and aligning a thruster attached to said spacecraft along said rotation axis, T.

15. The method of claim 14, comprising the step of:

rotating said radiation receiving element relative to said spacecraft body about the S-axis by an angular amount β in response to said measured position so that said radiation receiving element is normal to said radiation source.

16. The method of claim 15, comprising the step of:

rotating said radiation receiving element relative to said spacecraft body about a secondary axis, which is perpendicular to said S-axis, by an angular amount α in response to said measured position so that said radiation receiving element is normal to said radiation source.

17. The method of claim 14, wherein said measuring step comprises measuring the azimuth and elevational angles η and ρ, respectively, of said radiation source relative to said rotation axis T.

* * * * *